(12) United States Patent
Cheston et al.

(10) Patent No.: US 7,337,310 B2
(45) Date of Patent: Feb. 26, 2008

(54) COMPUTER DISPOSAL APPARATUS, SYSTEM, AND METHOD

(75) Inventors: Richard W. Cheston, Morrisville, NC (US); Daryl Carvis Cromer, Apex, NC (US); Jan Michael Janick, Cary, NC (US); John Peter Karidis, Ossining, NY (US); Howard Jeffrey Locker, Cary, NC (US); Randall Scott Springfield, Chapel Hill, NC (US)

(73) Assignee: Lenovo Pte Ltd, Central (SG)

( * ) Notice: Subject to any disclaimer, the term of this patent is extended or adjusted under 35 U.S.C. 154(b) by 480 days.

(21) Appl. No.: 10/967,821

(22) Filed: Oct. 18, 2004

(65) Prior Publication Data

US 2006/0085625 A1    Apr. 20, 2006

(51) Int. Cl.
*G06F 9/00* (2006.01)
*G06F 9/24* (2006.01)
*G06F 15/177* (2006.01)

(52) U.S. Cl. .............. 713/1; 713/2; 713/100; 726/26; 726/27; 726/28; 726/29; 726/30; 726/31; 726/32; 726/33; 726/34; 726/35; 726/36; 711/164

(58) Field of Classification Search ............. 713/1, 713/2, 100; 726/1–36; 705/64–79
See application file for complete search history.

(56) References Cited

U.S. PATENT DOCUMENTS

| | | | |
|---|---|---|---|
| 5,632,012 A * | 5/1997 | Belsan et al. ............. 714/6 |
| 6,317,826 B1 | 11/2001 | McCall et al. ............. 713/1 |
| 6,601,096 B1 | 7/2003 | Lassiter, Jr. ............. 709/222 |
| 6,813,708 B2 * | 11/2004 | Smith et al. ............. 713/1 |
| 2002/0078188 A1 | 6/2002 | Anand et al. ............. 709/222 |
| 2002/0078396 A1 | 6/2002 | Murphrey et al. ............. 714/6 |
| 2003/0120772 A1 | 6/2003 | Husain et al. ............. 709/224 |
| 2003/0126426 A1 | 7/2003 | Frye, Jr. ............. 713/2 |
| 2003/0200428 A1 | 10/2003 | Chan et al. ............. 713/1 |
| 2004/0039587 A1 * | 2/2004 | Horoshige et al ............. 705/1 |
| 2004/0268073 A1 * | 12/2004 | Morisawa ............. 711/164 |
| 2005/0091073 A1 * | 4/2005 | Harris ............. 705/1 |
| 2005/0289289 A1 * | 12/2005 | Chang ............. 711/103 |

OTHER PUBLICATIONS

CJ Paul et al. "Method and system for fault-tolerant remote boot in the presence of boot server overload/failure with self-throttling boot servers" Dossier AUS920000858.
CJ Paul et al. "Method and system for dynamic redistribution of remote computer boot service in a network containing multiple boot servers." Dossier AUS920010380.

* cited by examiner

Primary Examiner—Rehana Perveen
Assistant Examiner—James F Sugent
(74) Attorney, Agent, or Firm—Kunzler & McKenzie

(57) ABSTRACT

An apparatus, system, and method are disclosed for autonomically disposing a computer such as a workstation. The computer's local persistent storage medium is configured with pre-boot image which is configured with a set of functional modules that facilitate disposal or recycling of the computer to the next user. The disposal and recycle methods are automated, require minimal user intervention, and facilitate moving configuration options and data to a different computer. The entire process may execute from the pre-boot image on the computer's local persistent storage medium without ever booting the primary operating system.

26 Claims, 5 Drawing Sheets

COMPUTER DISPOSAL APPARATUS, SYSTEM, AND METHOD

BACKGROUND OF THE INVENTION

1. Field of the Invention

The present invention relates generally to means and methods for configuring and maintaining computer systems. Specifically, the present invention relates to apparatus, systems, and methods for disposing and/or recycling computers including erasing and re-imaging computers.

2. Description of the Related Art

Computers and computer software are constantly improving and changing. When a new computer is acquired, the computer user typically desires that the majority of applications that were present on the old computer also be installed on the new computer. In addition, users typically desire that configuration options and data files associated with applications as well as configuration options associated with their computing environment be transferred to their new computer.

Each computer user may have dozens of applications and hundreds of associated data files. Installing the desired applications, transferring the desired data files and setting the preferred configuration options may consume many man-hours. Even in cases where a computer is to be simply discarded, the process of archiving old data and erasing confidential data stored on the computer may consume considerable time.

Enterprises such as businesses and institutions typically want to ensure that critical data is erased in a secure way in order to protect confidential information. Additionally, such organizations often require that inventory asset databases be updated before an old computer is either discarded or recycled to a new user.

As a result of the aforementioned issues, the process of configuring new computers and disposing of old computers is a major cost for enterprises. Many corporations send their computers to a centralized location for computer disposal or recycling. Typically, a centralized location has greater resources and expertise over local users and administrators and can ensure the correct recycle or discard polices are performed. However, even with greater resources and expertise, computer recycling is often an incomplete process that requires the new user to install particular applications and set particular configurations options. Furthermore, the cost and time associated with shipping computers to and from a centralized location reduces the attractiveness of such a solution.

From the foregoing discussion, it should be apparent that a need exists for an apparatus, system and method that would securely erase and re-image a computer autonomically. Preferably, the apparatus, system and method would require minimal input from users and work with a wide variety of operating systems. Beneficially, such an apparatus, system, and method would be simple to use and cost-effective to enterprises and individuals who have an ongoing need to configure new computers and dispose of or recycle used computers.

SUMMARY OF THE INVENTION

The present invention has been developed in response to the present state of the art, and in particular, in response to the problems and needs in the art that have not yet been fully solved by currently available technology for configuring, disposing, and recycling computers. Accordingly, the present invention has been developed to provide an apparatus, system, and method for disposing of and/or recycling computers that overcome many or all of the above-discussed shortcomings in the art.

In one aspect of the present invention, an apparatus to automatically dispose of a computer includes a pre-boot executable image comprising a set of executable modules that facilitate disposing of, or recycling, a computer. In one embodiment, the executable modules include an interface module configured to prompt the user with at least one disposal option, an archive module configured to store user data contained on a local persistent storage medium to a remote location, and a disposal module configured to securely erase the local persistent storage medium.

The pre-boot executable image may reside wholly or partially within a bootable ROM or a dedicated region on the local persistent storage medium such a pre-boot sector or pre-boot partition. In addition to securely erasing the local persistent storage, other disposal related functions may be provided by the executable modules such as authenticating the user, changing asset records associated with the computer, and archiving user related information such as passwords, configuration data, and data files to a remote location.

In certain embodiments, the executable modules include a recycle module that authenticates a new user, boots the computer from a downloadable image provided by an install server or the like, initiates retrieval of user data corresponding to a new user from an archive server or the like, stores retrieved user data to the local persistent storage medium, and updates asset records corresponding to the computer.

In one embodiment, the executable modules are configured to automatically and securely store data associated with a user, and securely erase the data from the computer's local persistent storage medium and re-image the local persistent storage medium with user data associated with a new user.

In another aspect of the present invention, a system to automatically dispose of a computer includes a computer equipped with the aforementioned pre-boot executable image, an archive server configured to archive the user data, and a remote install server configured to provide an install image to the computer.

It should be noted that references to features, advantages, or similar language included in this specification does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

The present invention facilitates automatic disposal and/or recycling of computers in a secure manner independent of the operating system which may reside thereon. These and other features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
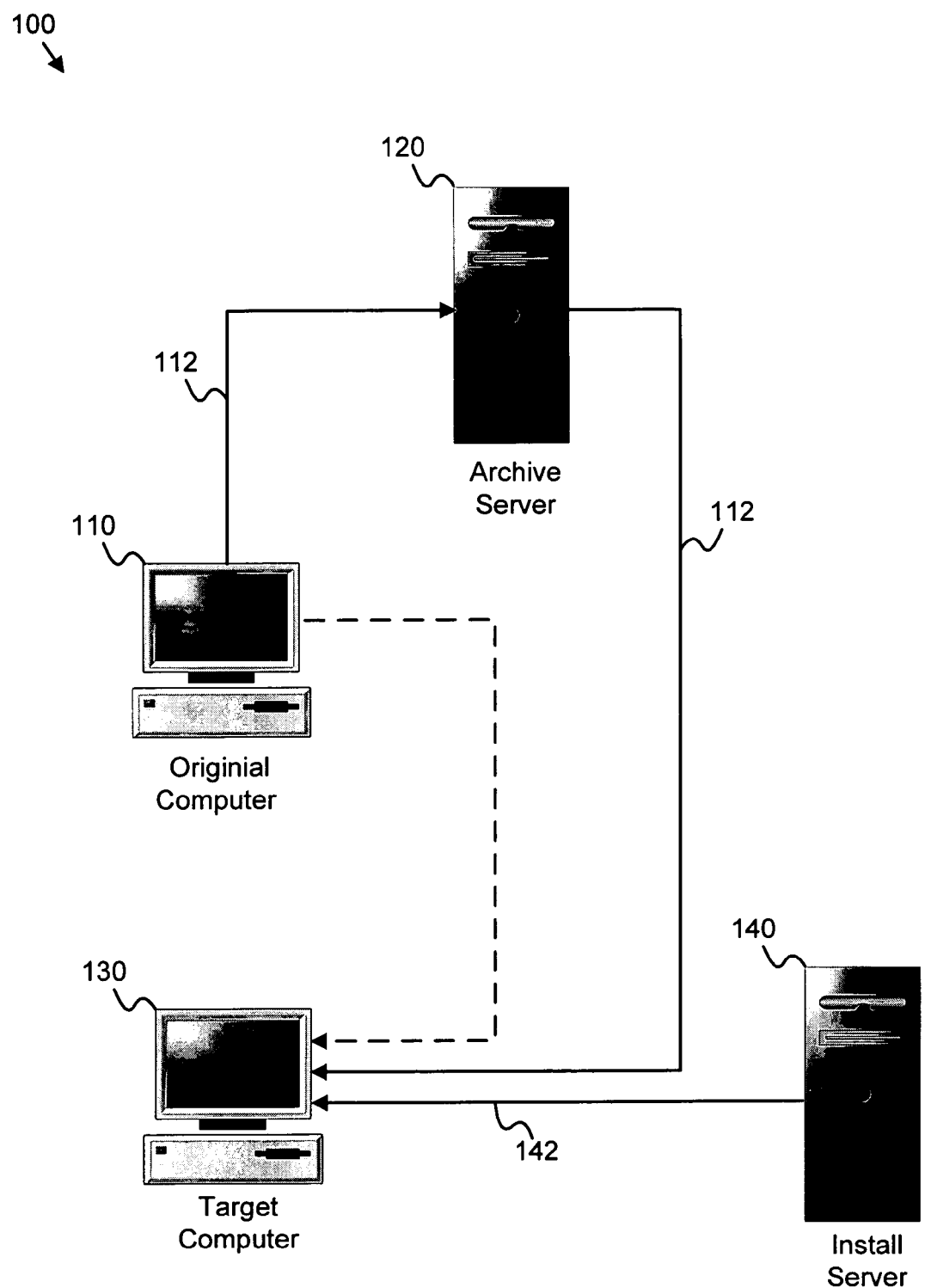
FIG. 1 is a block diagram depicting one embodiment of a computer disposal system of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

FIG. 1 is a block diagram depicting one embodiment of a computer disposal system 100 of the present invention. As depicted, the disposal system 100 includes an original computer 110, an archive server 120, a target computer 130, and a install server 140. The archive server and install server can actually be the same server. The disposal system 100 facilitates disposing a computer such as the original computer 110 and data associated therewith, and recycling the associated data to another computer such as the target computer 130. The original computer and the target computer can also be physically the same computer if you are going to recycle the computer to a different user.

The original computer 110 may include a local persistent storage medium configured with a pre-boot image (not shown). The pre-boot image preferably contains a set of functional modules that facilitate disposing or recycling the original computer 110. Placing the functional modules within the pre-boot image enables execution of disposal options independent from any operating system present on the local persistent storage medium or the like.

The archive server 120 receives and archives all of the user data 112, such as disk images, configuration information, and passwords stored on the original computer 110. Once safely archived, the original computer 110's local persistent storage medium may be erased for disposal or recycling to another user. In one embodiment, the archive server 120 also manages asset records associated with the computers 110 and 130 and may update those records as needed.

The functional modules of the pre-boot image may provide a recycling option to the user. Recycling may be conducted separately from, or in conjunction with, the aforementioned disposal process. Recycling facilitates configuring the target computer 130, which may be a used computer or a new computer. If the computer 110 is to be recycled, the original computer 110 also functions as a target computer 130.

The target computer 130 may include a local persistent storage medium configured with a pre-boot image (not shown). The pre-boot image may be the same pre-boot image described in conjunction with the original computer 110 and preferably contains a set of functional modules that facilitate recycling the target computer 130. Placing the functional modules in the pre-boot images enables execution of a recycling option even though the main image of the local persistent storage medium may have been erased.

The target computer 130 may authenticate a new user and communicate with the install server 140 and download an install image 142 to the target computer's 130 local persistent storage medium. The functional modules within the install image 142 or the already loaded pre-boot image may prompt the user for identification and password information and locate information on the archive server 120 corresponding to a previously disposed computer such as the original computer 110.

The archive server 120 may provide previously archived user data 112 such as disk images, configuration information, and passwords to the target computer 130. In certain embodiments, the archive server 120 may also update asset records such as asset records associated with the target computer 130.

Figure 2:
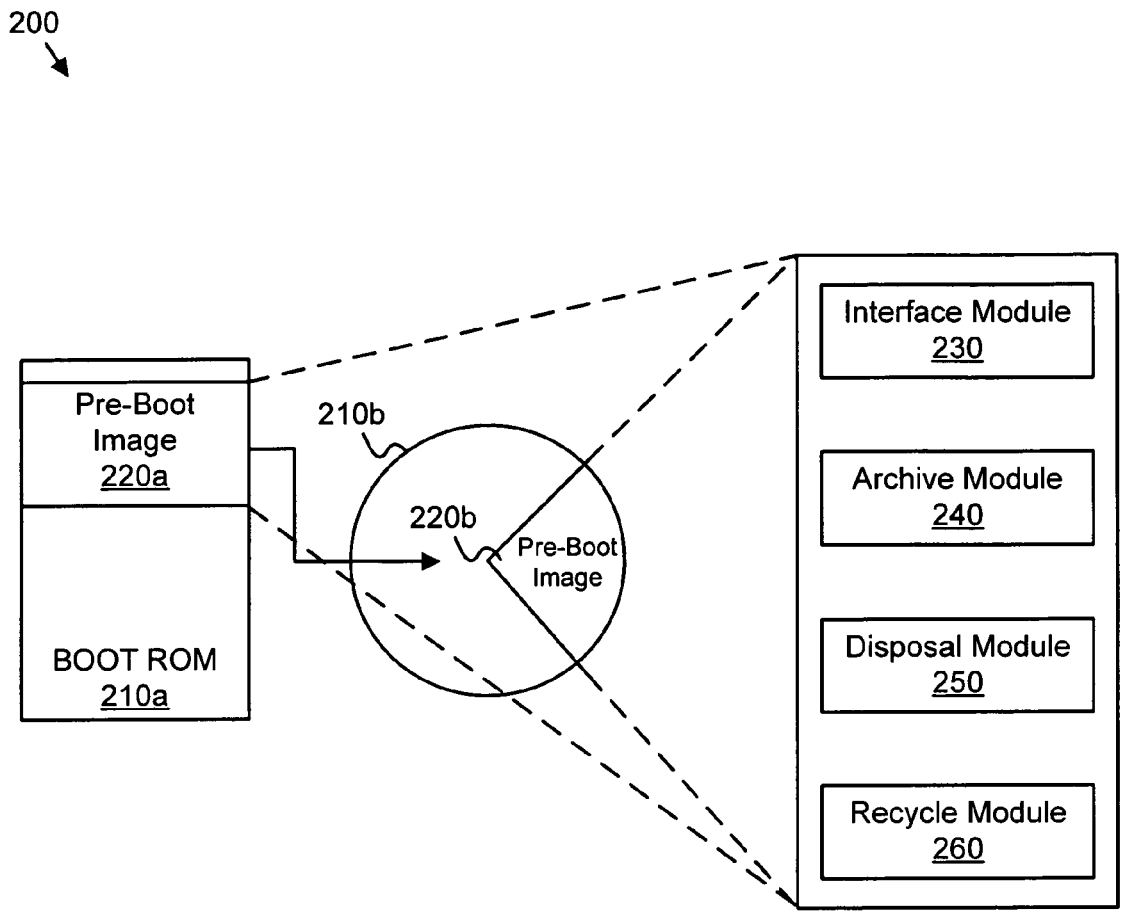
FIG. 2 is a block diagram depicting certain elements of one embodiment of a recyclable computer of the present invention.

FIG. 2 is a block diagram depicting one embodiment of a recyclable computer 200 of the present invention. As depicted, the recyclable computer 200 includes local persistent storage medium 210 configured with a pre-boot image 220 containing a variety of modules that facilitate proper disposal and/or recycling of the recyclable computer 200 such as an interface module 230, an archive module 240, a disposal module 250, and a recycle module 260.

The local persistent storage medium 210 may be a solid state memory, a magnetic storage device, an optical storage device or the like. In certain embodiments, the pre-boot image 220 may be distributed across several storage devices that collectively comprise a storage medium. For example, in the depicted embodiment the pre-boot image 220 is stored within a bootable ROM 210*a* and a pre-boot region 220*b* of a rotational storage device 210*b*. In one embodiment, the pre-boot region is a partition on the rotational storage device 210*b*. In another embodiment, the pre-boot region is a dedicated sector on the rotational storage device 210*b*. Regardless of the location(s) of the pre-boot image, the depicted modules operate together to provide disposal and/or recycling functionality to the computer 200 independent of the operating system installed thereon.

The interface module 230 presents an interface to the user which first lets users choose whether or not to dispose of the computer. In one embodiment, regardless of which option a user chooses, the archive module 240 tests for, verifies, and stores user-related data such as disk images, configuration information, and passwords, etc. In another embodiment, the user-related data could be archived in a compressed file form. In an additional embodiment, the archive module 240 copies user data to a storage location, such as the archive server 120 depicted in FIG. 1.

The disposal module 250 securely erases the data from the computer's local persistent storage medium. In one embodiment, the disposal module 250 removes the computer from the asset records.

If the user chooses to recycle the computer, the recycle module 260 prepares the computer to be recycled to the next user. In one embodiment, the recycle module 260 downloads a pre-boot environment onto the computer's local persistent storage medium. In another embodiment, the recycle module 260 downloads an install image onto the computer. In an additional embodiment, the recycle module 260 checks if a valid install image or pre-boot environment exists on the computer. The recycle module 260 preferably retrieves user-related data such as disk images, configuration information, registry settings, passwords and the like and copies the user-related data to the target workstation.

The following schematic flow chart diagrams are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 3:
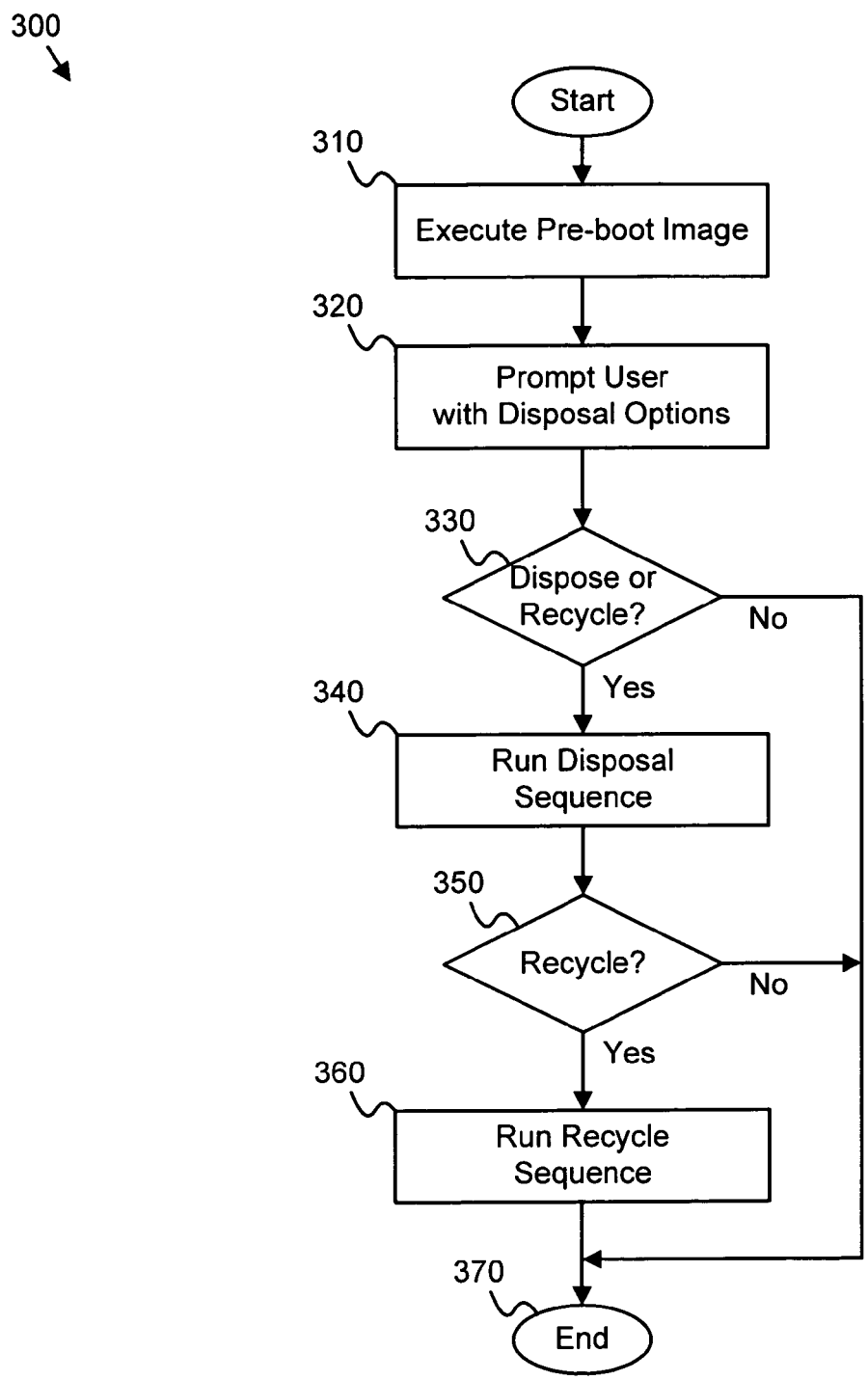
FIG. 3 is a flow chart diagram depicting one embodiment of a pre-boot disposal method of the present invention.

FIG. 3 is a flow chart diagram depicting one embodiment of a computer disposal method 300 of the present invention. As depicted, the computer disposal method 300 includes an execute pre-boot image step 310, a prompt user step 320, a dispose or recycle test 330, a disposal sequence 340, a recycle test 350, and a recycle sequence 360. The computer disposal method 300 facilitates proper disposal or recycling of a computer. In one embodiment, the computer disposal method 300 executes entirely from a pre-boot image within a persistent storage medium (such as the local persistent storage medium 210 depicted in FIG. 2) previous to booting any operating system associated with the computer.

The execute pre-boot image step 310 loads and executes a pre-boot image that is locally stored. In one embodiment, the pre-boot image starts the computer into a pre-boot environment, without executing a primary operating system. The pre-boot image may be stored in a solid state memory, a magnetic storage device, an optical storage device, or the like. In one embodiment, the pre-boot image is stored in a bootable ROM. In another embodiment, the pre-boot image is stored on a dedicated partition of a rotational storage device.

The prompt user step 320 presents a user with an interface that offers users one or more disposal options. In one embodiment, the user may select either a dispose option that securely erases the primary media on the computer or a recycle option that erases and re-images the primary media. The dispose or recycle test 330 ascertains if a disposal or recycle option was selected. If a disposal or recycle option was not selected the method ends 370. If a disposal or recycle option was selected the method continues to the disposal sequence 340.

The disposal sequence 340 prepares the computer to for safe disposal. In one embodiment, the disposal sequence 340 tests for, verifies, stores, and deletes passwords associated with the computer. In certain embodiments, the disposal sequence 340 archives user data to a storage location, such as the archive server 120 depicted in FIG. 1. After user data is securely archived, the disposal sequence 340 may also securely erase the computer's persistent storage medium and any volatile storage memory associated therewith. In one embodiment, the disposal sequence 340 updates asset records associated with the computer. As a result of the functions performed by the disposal sequence 340, the computer may be safely transferred to the next user.

The recycle test 350 checks if the computer is to be recycled. If the computer is not to be recycled the method ends 370. If the computer is to be recycled the method continues to the recycle sequence 360.

The depicted recycle sequence 360 treats the computer as the target computer 130 depicted in FIG. 1. Normally, a computer would be recycled to a different user. However, in certain cases it may be desirable to recycle a computer to the same user. In one embodiment, the recycle sequence 360 downloads an install image onto the target workstation. In another embodiment, the recycle sequence 360 checks the computer to ensure that it has a suitable pre-boot image already loaded that may also function as the install image.

The install image preferably includes the code and steps necessary to configure the computer for the next user. In one embodiment, the recycle sequence 360 authenticates the next user, retrieves archived data associated with the next user, and copies the data to a local persistent storage medium. User data might include such data as disk images, configuration information, and passwords. In one embodiment, the recycle sequence 360 updates the asset records so that the computer is transferred to the next user.

Figure 4:
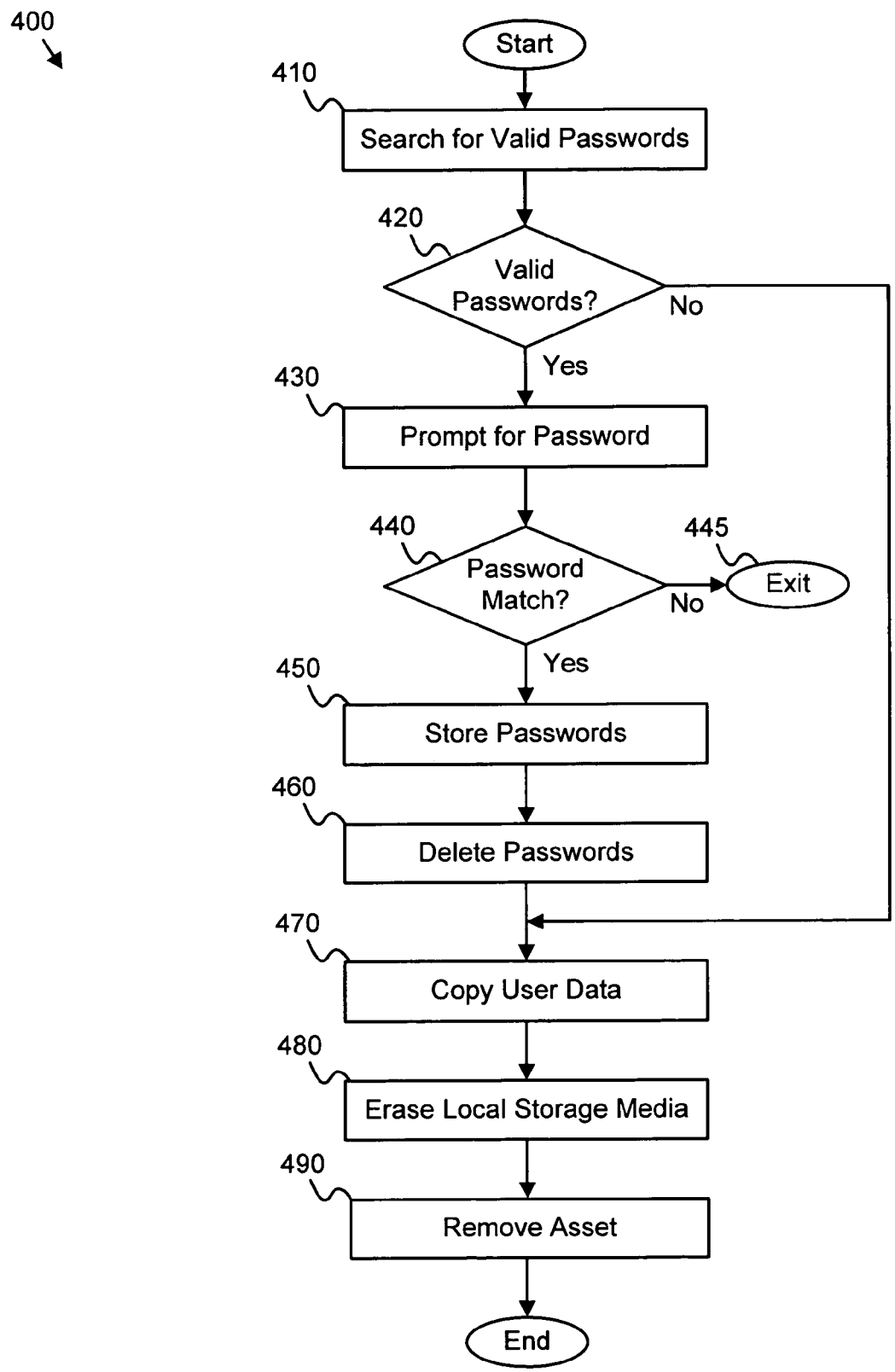
FIG. 4 is a flow chart diagram depicting one embodiment of a computer disposal method of the present invention.

FIG. 4 is a flow chart diagram depicting one embodiment of a computer disposal method 400 of the present invention. As depicted, the computer disposal method 400 includes a search for valid passwords step 410, a valid passwords test 420, a prompt for password step 430, a password match test 440, a store passwords step 450, a delete passwords step 460, a copy user data step 470, an erase local storage media step 480, and a remove asset step 490. The computer disposal method 400 facilitates proper disposal of a computer. The computer disposal method 400 may execute entirely from a pre-boot image within a persistent storage medium (such as the local persistent storage medium 210 depicted in FIG. 2) previous to booting any operating system associated with the computer.

The computer disposal method 400 is one example of the disposal sequence 340 depicted in FIG. 3. In one embodiment, the computer disposal method 400 is executed regardless of whether the computer is to be disposed of or recycled to another user. In another embodiment, the computer disposal method is conducted prior to executing the computer recycling method 500. In an additional embodiment, the computer disposal method 400 is conducted in conjunction with the computer recycling method 500.

The search for valid passwords step 410 searches the system for any relevant passwords, such as administrative passwords, storage access passwords, user passwords, and the like. Subsequently, the valid passwords test 420 ascertains if any relevant passwords were found. If no valid passwords found, the depicted method 400 skips to the copy user data step 470. If the valid passwords test 410 ascertains that valid passwords were found, the computer disposal method 400 continues to the prompt for password step 430.

The prompt for password step 430 prompts the user for a valid password. In one embodiment, the prompt for password step 430 starts a cycle that includes the password match test 440, the store password step 450, and the delete password step 460. This cycle continues until all the associated passwords have been verified, archived and deleted.

The password match test 440 tests the password entered by the user in response to the prompt for password step 430. In one embodiment, if the password entered by the user doesn't match one of the passwords found by the search for passwords step 410, the password match test 440 proceeds to an exit step 445 and returns an error, such as "Unauthorized User." If the password match test 440 verifies that the user-input password is correct, the computer disposal method proceeds to the store passwords step 450.

The store passwords step 450 stores the passwords validated in the match password test 440. In certain embodiments, the store passwords step 450 archives these passwords to a storage location, such as the archive server 120 depicted in FIG. 1.

After the passwords have been archived, the delete passwords step 460 securely deletes the verified passwords. In one embodiment, the passwords are deleted in such a way as to render them completely unrecoverable.

The copy user data step 470 copies user data which could include such information as executable images, configuration information, registry settings, and the like. In one embodiment, the copy user data step 470 includes transmitting the user data to an archive server such as the archive server 120 depicted in FIG. 1.

The erase user data step 480 securely erases the computer's persistent storage medium and any volatile storage memory associated therewith. In one embodiment, erasing is conducted in a manner that preserves the pre-boot image. In another embodiment, the remove asset step 490 updates asset records associated with the computer. As a result of the functions performed by the computer disposal method 400, the computer may be safely disposed of or transferred to another user.

Figure 5:
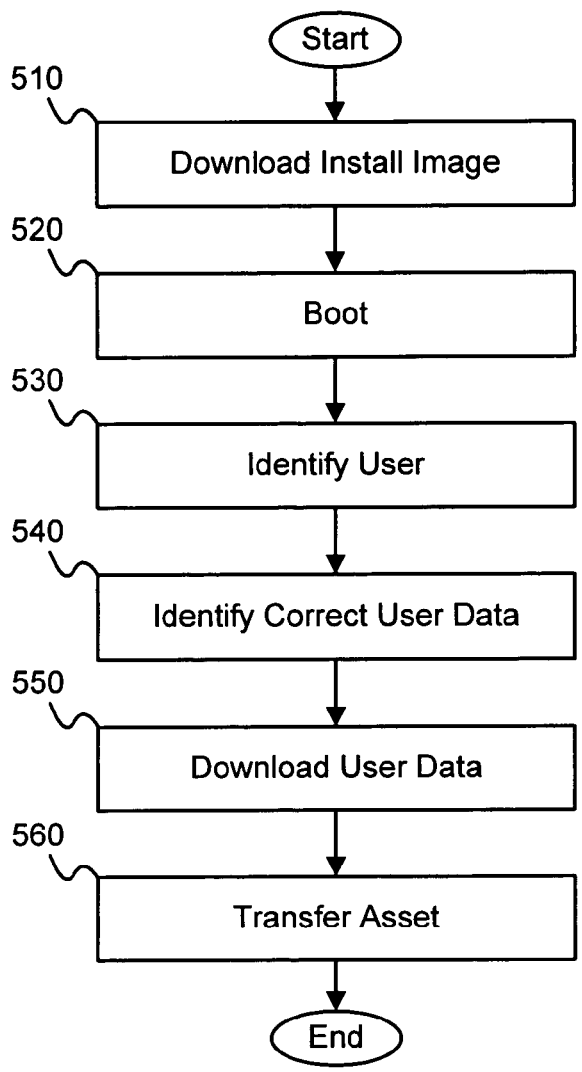
FIG. 5 is a flow chart diagram depicting one embodiment of a computer recycling method of the present invention.

FIG. 5 is a flow chart diagram depicting one embodiment of a computer recycling method 500 of the present invention. As depicted, the computer recycling method 500 includes a download install image step 510, an optional boot step 520, an identify user step 530, an identify correct user data step 540, a download user data step 550, and a transfer asset to new user step 560. The computer recycling method 500 facilitates proper and easy recycling of a computer to the next user.

The computer recycling method 500 treats a computer as the target computer 130 depicted in FIG. 1 and is one example of the recycle sequence 360 depicted in FIG. 3. The computer recycling method 500 may proceed directly from the computer disposal method 400 and may be executed from a pre-boot image, or the like. In one embodiment, the pre-boot image is contained within a dedicated sector or partition of a rotational storage device, such as the rotational storage device 210b depicted in FIG. 2.

The download install image step 510 downloads an install image to the computer. The install image may be a bootable image that enables the computer to be booted automatically even with an erased boot sector. In one embodiment, the download install image step 510 checks the computer to see if it already has a suitable pre-boot image loaded that is capable of functioning as the install image. The install image preferably includes the code and steps necessary to configure the computer for the next user.

The optional boot step 520 boots the computer using the bootable install image downloaded in step 510. In one embodiment, the computer is booted into a pre-boot environment in order to prepare the computer for the next user. The identify next user step 530 identifies the next user of the computer. In one embodiment, the identify next user step 530 prompts the user for a particular type of identification. The identification may take the form of a password, biographical information, biometrics, or other type of user credentials. In certain embodiments, the prompt user step 530 also authenticates the user identification to ensure that it is correct.

The identify user data step 540, identifies and locates previously archived information for the next user. In one embodiment, an archive server, such as the archive server 120 in FIG. 1, receives a user identifier and retrieves information corresponding to the correct user from a database. User data may include such data as disk images, configuration information, registry settings, and, passwords The download user data step 550 copies the correct user information, located in step 540, to the computer. The download user data step 550 may also restore the user's personal data such as installed applications, disk image, configuration information, and passwords originating from a previous system. Subsequently, the transfer asset step 560 updates the asset records so that the computer is transferred to the next user. The next user is now able to take possession of the target computer.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus to automatically dispose of a computer, the apparatus comprising:
   a pre-boot executable image comprising a plurality of executable modules including:
   an interface module configured to prompt the user with at least one disposal option;
   an archive module configured to store user data contained on a local persistent storage medium to a remote location; and
   a disposal module configured to securely erase the local persistent storage medium.

2. The apparatus of claim 1, wherein an executable module of the plurality of executable modules resides within a pre-boot region of the local persistent storage medium.

3. The apparatus of claim 2, wherein the pre-boot region is selected from the group consisting of a pre-boot sector and a pre-boot partition.

4. The apparatus of claim 1, wherein an executable module of the plurality of executable modules resides within a bootable ROM.

5. The apparatus of claim 1, wherein the disposal module is further configured to remove the computer from asset records.

6. The apparatus of claim 1, wherein the archive module is further configured to authenticate the user.

7. The apparatus of claim 1, wherein the archive module is further configured to store at least one password.

8. The apparatus of claim 7, wherein the disposal module is further configured to securely remove the at least one password.

9. The apparatus of claim 1, wherein the archive module is further configured to copy user data to a remote storage location.

10. An apparatus to automatically dispose of and recycle a computer, the apparatus comprising:
    a pre-boot executable image comprising a plurality of executable modules including:
    an interface module configured to prompt the user with at least one disposal option;
    a disposal module configured to securely erase a local persistent storage medium; and
    a recycle module configured to initiate retrieval of user data corresponding to a new user from a remote location.

11. The apparatus of claim 10, wherein the recycle module is further configured to authenticate the new user.

12. The apparatus of claim 10, wherein the recycle module is further configured to boot the computer from a downloadable image.

13. The apparatus of claim 10, wherein the recycle module is further configured to write retrieved user data to the local persistent storage medium.

14. The apparatus of claim 10, wherein the recycle module is further configured to update asset records corresponding to the computer.

15. An method to automatically dispose of a computer, the method comprising:
    executing a pre-boot image configured to prompt the user with at least one disposal option;
    storing user data contained on a local persistent storage medium to a remote location during a pre-boot phase while executing the pre-boot image; and
    erasing the local persistent storage medium.

16. The method of claim 15, further comprising updating asset records.

17. The method of claim 15, further comprising authenticating the user.

18. The method of claim 15, further comprising storing at least one password.

19. The method of claim 18, further comprising securely removing the at least one password.

20. The method of claim 15, further comprising copying user data to a remote storage location.

21. The method of claim 15, further comprising downloading an install image.

22. An apparatus to automatically dispose of a computer, the apparatus comprising:
    a pre-boot executable image comprising:
    means for prompting a user with at least one disposal option;
    means for archiving user data contained on a local persistent storage medium to a remote location; and
    means for securely erasing all data on the local persistent storage medium.

23. A system to automatically dispose of a computer, the system comprising:
    a computer having a pre-boot executable image comprising a plurality of executable modules including:
    an interface module configured to prompt the user with at least one disposal option,
    an archive module configured to store user data contained on a local persistent storage medium to a remote location, and
    a disposal module configured to securely erase a local persistent storage medium;
    an archive server configured to archive the user data; and
    a remote install server configured to provide an install image to the computer.

24. The system of claim 23, wherein at least one module of the plurality of executable modules resides within a pre-boot region.

25. The system of claim 23, wherein at least one module of the plurality of executable modules resides within a bootable ROM.

26. A software medium tangibly embodying a program of machine-readable instructions executable by a digital processing apparatus to perform operations to dispose of a computer, the operations comprising:
    operations for executing a pre-boot image configured to prompt the user with at least one disposal option;
    operations for storing user data contained on a local persistent storage medium to a remote location during a pre-boot phase while executing the pre-boot image; and
    operations for securely erasing the local persistent storage medium.

* * * * *